(12) United States Patent
Park et al.

(10) Patent No.: US 12,135,829 B2
(45) Date of Patent: Nov. 5, 2024

(54) SYSTEM ON CHIP INCLUDING SECURE PROCESSOR AND SEMICONDUCTOR SYSTEM INCLUDING THE SAME

(71) Applicant: Samsung Electronics Co., Ltd., Suwon-si (KR)

(72) Inventors: Keun Young Park, Seongnam-si (KR); Dong Jin Park, Seoul (KR); Ji Hyun Kim, Hwaseong-si (KR)

(73) Assignee: Samsung Electronics Co., Ltd, Gyeonggi-do (KR)

( * ) Notice: Subject to any disclaimer, the term of this patent is extended or adjusted under 35 U.S.C. 154(b) by 388 days.

(21) Appl. No.: 17/585,881

(22) Filed: Jan. 27, 2022

(65) Prior Publication Data
US 2022/0398349 A1 Dec. 15, 2022

(30) Foreign Application Priority Data

Jun. 15, 2021 (KR) ........................ 10-2021-0077282

(51) Int. Cl.
| | |
|---|---|
| *G06F 21/71* | (2013.01) |
| *G06F 12/14* | (2006.01) |
| *G06F 15/78* | (2006.01) |
| *G06F 21/60* | (2013.01) |

(52) U.S. Cl.
CPC .......... *G06F 21/71* (2013.01); *G06F 12/1408* (2013.01); *G06F 15/781* (2013.01); *G06F 21/602* (2013.01); *G06F 2212/1052* (2013.01)

(58) Field of Classification Search
CPC .... G06F 21/71; G06F 12/1408; G06F 15/781; G06F 21/602; G06F 2212/1052
See application file for complete search history.

(56) References Cited

U.S. PATENT DOCUMENTS

| | | | |
|---|---|---|---|
| 7,900,060 B2 | 3/2011 | Hodzic | |
| 9,438,424 B2 | 9/2016 | Goss et al. | |
| 10,936,719 B2 | 3/2021 | Sibert et al. | |
| 11,232,536 B2* | 1/2022 | Lake | ........................ G06T 1/60 |
| 11,871,331 B2* | 1/2024 | Nayak | ................... H04W 48/02 |
| 2013/0145475 A1* | 6/2013 | Ryu | ........................ G06F 21/31 |
| | | | 726/26 |
| 2013/0219508 A1* | 8/2013 | Lee | ........................ G06F 21/60 |
| | | | 726/26 |

(Continued)

*Primary Examiner* — Michael W Chao
*Assistant Examiner* — Peiliang Pan
(74) *Attorney, Agent, or Firm* — Harness, Dickey & Pierce, P.L.C.

(57) ABSTRACT

A secure processor and a semiconductor system including the same is provided. Provided is a system on chip comprising a secure processor, wherein the secure processor includes: a random access memory (RAM) including a RAM cache area storing a page and a timestamp table storing a timestamp, an encryption/decryption engine configured to encrypt the page by using the timestamp, and a direct memory access (DMA) module configured to transmit the encrypted page to a swap area of a first memory disposed outside the system on chip, wherein the first memory includes a tag table area storing a tag generated by the encryption/decryption engine encrypting the page and a timestamp backup area backing up the timestamp, and the swap area, the tag table area, and the time stamp backup area are backed up in a second memory disposed outside the system on chip.

20 Claims, 22 Drawing Sheets

(56) References Cited

U.S. PATENT DOCUMENTS

| | | |
|---|---|---|
| 2014/0020114 A1 | 1/2014 | Bhatia et al. |
| 2016/0299854 A1 | 10/2016 | Deivasigamani et al. |
| 2018/0300261 A1* | 10/2018 | Narayanasamy ....... G06F 13/16 |
| 2019/0095350 A1* | 3/2019 | Durham ................... G06F 21/53 |
| 2020/0242274 A1 | 7/2020 | Pan |
| 2020/0356493 A1* | 11/2020 | Mukherjee .......... G06F 9/45558 |
| 2020/0379809 A1* | 12/2020 | Yudanov ................. G06N 3/045 |
| 2020/0382316 A1 | 12/2020 | Boscher et al. |

* cited by examiner

FIG. 2

MMT                                                          ⌐121

| Page #0 | VA | PA | D | V | Etc |
| Page #1 | VA | PA | D | V | Etc |
| ⋮ |
| Page #n | VA | PA | D | V | Etc |

FIG. 14

Secure Data Info

| | | | |
|---|---|---|---|
| SW #0 | UUID | Active set | Master Timestamp(A) / Master TAG(A) <br> Master Timestamp(B) / Master TAG(B) |
| SW #1 | UUID | Active set | Master Timestamp(A) / Master TAG(A) <br> Master Timestamp(B) / Master TAG(B) |
| ... | | | |
| SW #N | UUID | Active set | Master Timestamp(A) / Master TAG(A) <br> Master Timestamp(B) / Master TAG(B) |

400

SYSTEM ON CHIP INCLUDING SECURE PROCESSOR AND SEMICONDUCTOR SYSTEM INCLUDING THE SAME

CROSS-REFERENCE TO RELATED APPLICATION

This application claims priority from Korean Patent Application No. 10-2021-0077282 filed on Jun. 15, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a system on chip including a secure processor and a semiconductor system including the same.

2. Description of the Related Art

The application processor (AP) may be implemented in the form of a system on chip (hereinafter referred to as an SoC). The SoC may represent one chip on which various systems are integrated. As the SoC integrates various systems, the capacity of the SoC's internal memory (e.g., static random access memory (SRAM)) may be limited. Due to the limited capacity of the internal memory, the SoC may communicate with an external memory device.

Meanwhile, the SoC may include a secure element that provides a secure function and a secure storage position of the SoC. At this time, in the communication between the internal memory of the SoC and the external memory of the SoC, there is a need to improve the communication speed while maintaining security stability.

SUMMARY

Aspects of the present disclosure provide a system on chip with improved security and communication speed, and a semiconductor system including the same.

Aspects of the present disclosure also provide a secure processor with improved security and communication speed.

According to an aspect of the present inventive concept, there is provided a system on chip comprising a secure processor, wherein the secure processor includes: a RAM including a RAM cache area storing a page and a timestamp table storing a timestamp, an encryption/decryption engine configured to encrypt the page by using the timestamp, and a direct memory access (DMA) module configured to transmit the encrypted page to a swap area of a first memory disposed outside the system on chip, wherein the first memory includes a tag table area storing a tag generated by the encryption/decryption engine encrypting the page and a timestamp backup area backing up the timestamp, and the swap area, the tag table area, and the time stamp backup area are backed up in a second memory disposed outside the system on chip.

According to an aspect of the present inventive concept, there is provided a secure processor comprising, a RAM configured to store a RAM cache area storing a page and a timestamp table storing a timestamp used to encrypt the page, an encryption/decryption engine configured to receive the page and the timestamp from the RAM, encrypt the page, and generate a tag; and a DMA module configured to transmit the encrypted page to a swap area of a first external memory and transmit the tag to a tag table area of the first external memory, wherein the swap area and the tag table area are backed up in a second external memory.

According to an aspect of the present inventive concept, there is provided a semiconductor system comprising: a system on chip including an application processor including a plurality of CPU cores and a secure processor; and a first memory and a second memory disposed outside the system on chip, wherein the secure processor includes a RAM configured to store a RAM cache area storing a page and a timestamp table storing a timestamp, an encryption/decryption engine configured to encrypt the page by using the timestamp, and a DMA module configured to transmit the encrypted page to a swap area of the first memory, the first memory includes a tag table area storing a tag generated by the encryption/decryption engine encrypting the page and a timestamp backup area backing up the timestamp, and the second memory includes a non-volatile data backup area in which the swap area, the tag table area, and the time stamp backup area are backed up.

BRIEF DESCRIPTION OF THE DRAWINGS

The above and other aspects and features of the present disclosure will become more apparent by describing in detail example embodiments thereof with reference to the attached drawings, in which:

FIG. 2 is an example diagram describing a memory management table (MMT).

FIG. 14 is an example diagram describing a secure data information area.

DETAILED DESCRIPTION OF THE EMBODIMENTS

Figure 1:
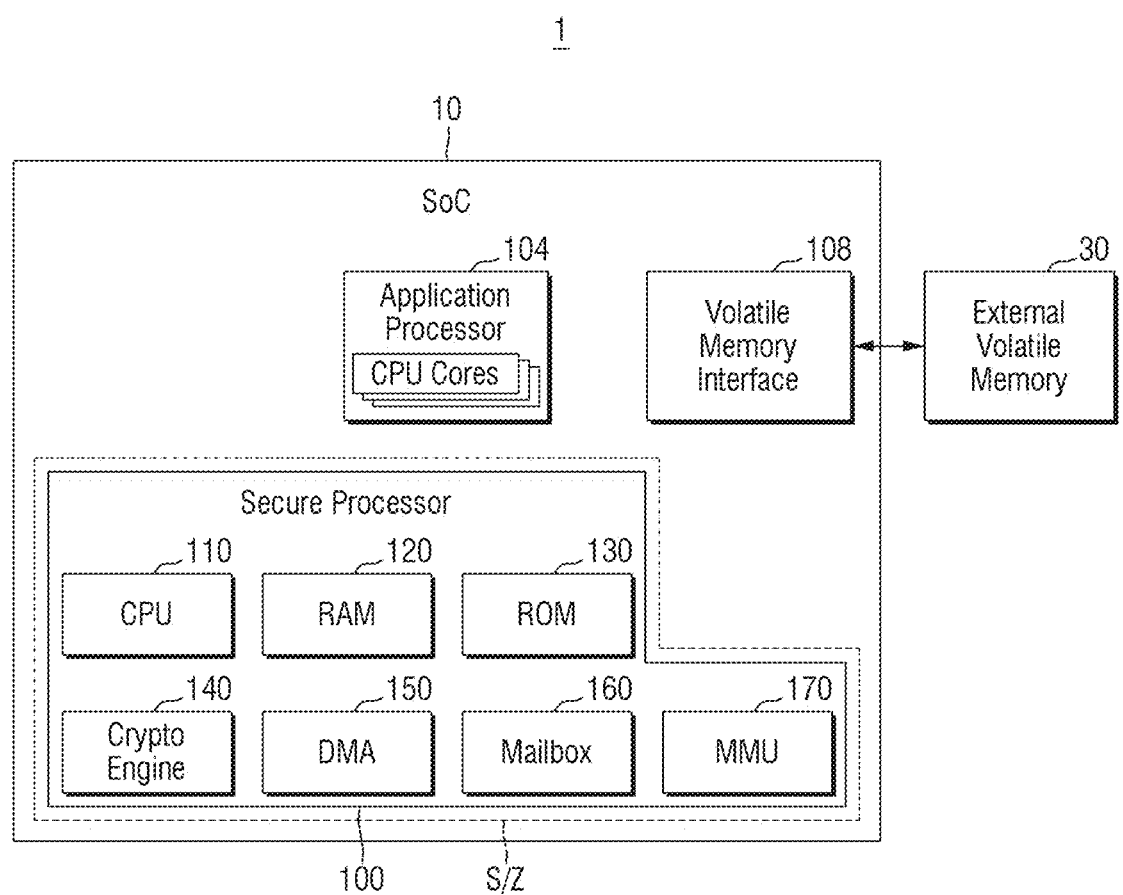
FIG. 1 is an example diagram illustrating a semiconductor system including a system on chip according to some embodiments.

FIG. 1 is an example diagram illustrating a semiconductor system including a system on chip according to some example embodiments.

Referring to FIG. 1, a semiconductor system 1 according to some example embodiments includes a system on chip 10 and a first memory 30 disposed outside the system on chip 10.

The system on chip 10 includes an application processor 104, a first memory interface 108, and a secure processor 100. The configuration of the system on chip 10 according to some example embodiments below is exemplary, and may further include a graphic processing unit (GPU), a codec, a scaler, a display controller, an access controller, and the like.

The system on chip 10 according to some example embodiments may be included, for example, in any one of a server, a computer, a smartphone, a tablet, a personal digital assistant (PDA), a digital camera, a portable multimedia player (PMP), a wearable device, an Internet of things (IoT) device, a smart speaker, an automotive, and the like, but is not limited thereto.

The application processor 104 includes a plurality of CPU cores and may process overall tasks of the system on chip 10. Each of the plurality of CPU cores is a processing unit supporting a TrustZone, and may be, for example, an ARM core. In the following description, it is assumed that the CPU 110 is an ARM core.

The first memory interface 108 may control the first memory 30.

The first memory 30 may be a volatile memory. For example, the first memory 30 may be a DRAM, SDRAM, DDRAM, or SRAM, but is not limited thereto.

The secure processor 100 may include a CPU 110, a RAM 120, a ROM 130, an encryption/decryption engine 140, a direct memory access (DMA) module 150, a mailbox 160, and a memory management unit (MMU) 170. The configuration of the secure processor 100 is example and may further include, for example, a function unit that cannot be physically copied, or a random number generator.

The secure processor 100 is isolated from the application processor 104 and may be operated by dedicated firmware. For example, the secure processor 100 may communicate with the application processor 104 through the internal mailbox 160. That is, although the software to be processed by the plurality of CPU cores of the application processor 104 is software executed in the TrustZone, access to the secure processor 100 may not be possible. In addition to the security function provided by the application processor 104, by configuring the secure processor 100 separately inside the system on chip 10, security may be improved. For example, software executed from the first memory 30 may not be able to access the RAM 120 in the secure processor 100 when security is not verified.

The CPU 110 may control the overall operation of the secure processor 100.

The ROM 130 may be, for example, a one-time programmable (OTP) memory. The ROM 130 may store a key required for the encryption/decryption engine 140 to perform an encryption operation. Although a part of the software executed through the secure processor 100 is stored in an external memory (e.g., the first memory 30), it may maintain security through a key stored in the ROM 130 of the secure processor 100 (confidentiality guaranteed).

The RAM 120 is a volatile memory and may be, for example, an SRAM. The RAM 120 may temporarily store, for example, security data or a security code, or the like. In addition, the RAM 120 may store a timestamp or a counter used for data encryption. In addition, the RAM 120 may store a memory management table (MMT) 121. The memory management table will be described in detail with reference to FIG. 2.

FIG. 2 is an example diagram describing a memory management table (MMT).

Referring to FIGS. 1 and 2, the memory management table 121 stores a virtual memory address (VA) and a physical memory address (PA) for each data or page (hereinafter, referred to as a page). In addition, the memory management table 121 may store dirtiness D, validity V, and other additional information (Etc) for each page.

The virtual memory address VA is a virtual address of each page unit of software executed by the CPU 110. The physical memory address PA is an address of a RAM cache area in the RAM 120 in which pages of software executed by the CPU 110 are stored.

The dirtiness D may indicate whether a page swapped in to the RAM cache area has been changed by the CPU 110 after being swapped in. For example, when a page swapped in from the first memory 30 to a RAM cache area 122 of the RAM 120 is subsequently changed by the CPU 110, dirty may be indicated in the dirtiness D.

The validity V may indicate whether information on each page, such as the virtual memory address VA, the physical memory address PA, and the dirtiness D described above, is valid. For example, when the dirtiness D for the corresponding page is incorrect, information indicating invalid may appear in the validity.

Referring to FIG. 1 again, when data in a secure zone S/Z is transmitted to the outside, the encryption/decryption engine 140 may perform encryption on the data. Alternatively, when data outside the secure zone S/Z accesses the secure zone S/Z, the encryption/decryption engine 140 may perform decryption on the data.

For example, the encryption/decryption engine 140 may include an encryption/decryption unit and a hash unit. The encryption/decryption unit may perform an encryption computation using a security parameter on the security data transmitted from the CPU 110 according to an encryption algorithm. When the encryption/decryption unit performs an encryption computation, a timestamp or a counter stored in the RAM 120 may be used. Hereinafter, it will be described using a timestamp. By using the timestamp for the encryption computation by the encryption/decryption unit, it may be safe from a replay attack that changes a part of the software running in the host environment to a different version.

The encryption/decryption unit may perform a decryption computation on encrypted data transmitted from an external memory (e.g., the first memory 30).

The encryption algorithm used by the encryption/decryption unit may be advanced encryption standard (AES), data encryption standard (DES), Triple DES, SEED, high security and light weight (HIGHT), ARIA, lightweight encryption algorithm (LEA), or the like. In addition, for example, the encryption algorithm may perform encryption computation in a block cipher mode. The block cipher mode may be Galois/counter mode (GCM), electronic code book (ECB) mode, cipher block chaining (CBC) mode, CTR mode, propagating cipher block chaining (PCBC) mode, cipher feedback (CFB) mode, or the like.

The hash unit may calculate a message authentication code (MAC) using the security parameter. The hash unit may calculate the message authentication code by using a hash-based message authentication code (HMAC) algorithm, a cipher-based message authentication code (CMAC) algorithm, or the like. For example, after encryption of security data is performed through the encryption/decryption unit, the hash unit may generate a tag for the encrypted data. Through this, it may be safe from tampering attacks that may occur when a part of data of software executed through the CPU 110 is stored in an external memory (e.g., the first memory 30) (integrity guaranteed).

The encryption/decryption engine 140 may perform encryption and decryption on the fly, and may generate a tag as described above at the same time.

The DMA module 150 may be connected to the encryption/decryption engine 140 to transmit the data or pages encrypted through the encryption/decryption engine 140 and the generated tag to the outside of the secure zone S/Z. In addition, the DMA module 150 may transmit data or pages and tags transmitted from the outside of the secure zone S/Z to the encryption/decryption engine 140.

The memory management unit 170 uses the memory management table stored in the RAM 120 to quickly convert a virtual address of software executed by the CPU 110 into a physical address, and helps the CPU 110 to access codes, data, or pages in the RAM cache area inside the RAM.

The RAM 120 may use an external memory (e.g., the first memory 30) when executing software having a size larger than the size of the RAM 120. The RAM 120 in the secure zone S/Z may have a small size, for example, from several tens of KB to several hundreds of KB. Accordingly, in order to execute software, which is larger than the size of the RAM 120 in the secure zone S/Z, in the secure zone S/Z, an external memory (e.g., the first memory 30) used by the application processor 104 may be utilized. In more detail, information (e.g., a memory management table, a page, or the like) used by the software may be swapped out from the RAM 120 in the secure zone S/Z to an external memory (e.g., the first memory 30). An operation of executing software larger than the size of the RAM 120 in the secure zone S/Z through a swap-out will be described with reference to FIG. 3. In addition, in FIG. 3, on the contrary, a swap-in operation for reading information (e.g., memory management table, page, or the like) used by the software from an external memory (e.g., the first memory 30), into the RAM 120 in the secure zone S/Z, will also be described. Hereinafter, the external memory will be described as the first memory 30.

Figure 3:
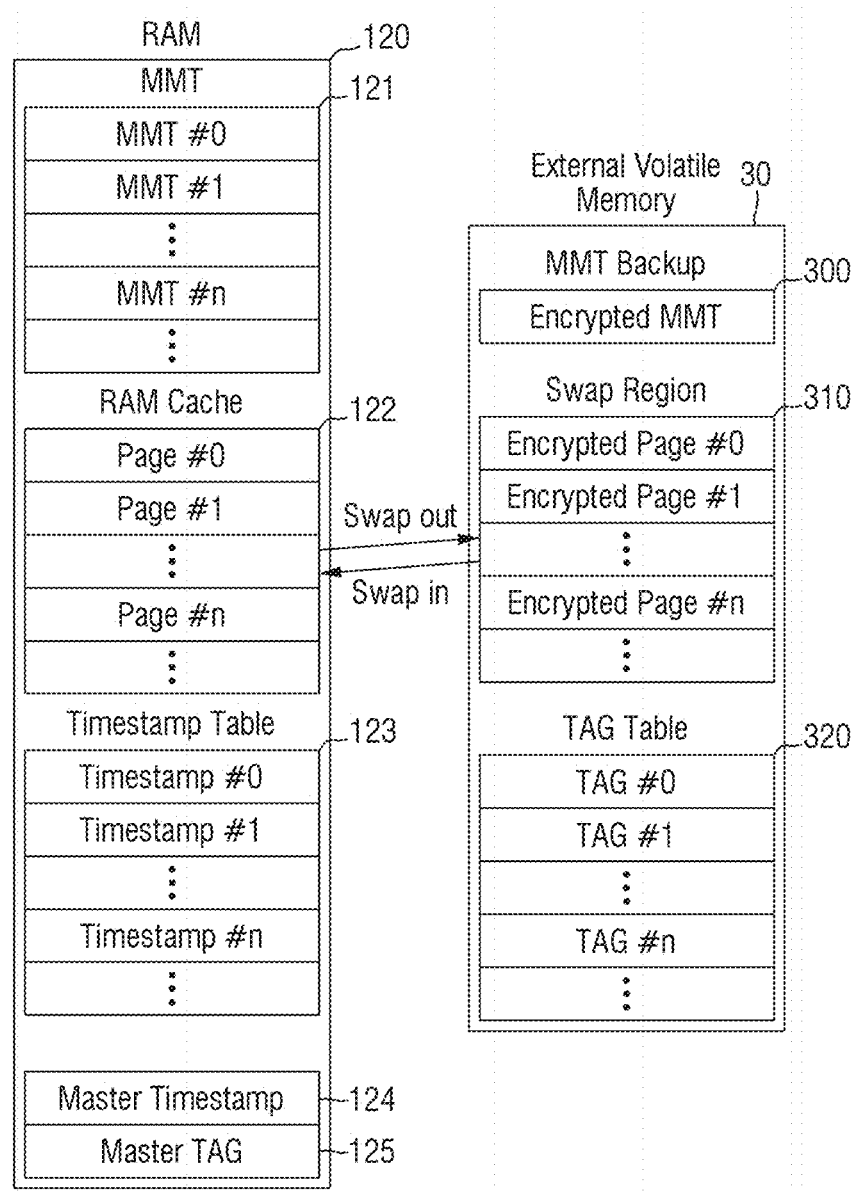
FIG. 3 is an example block diagram illustrating an operation of the semiconductor system of FIG. 1 according to some example embodiments.

FIG. 3 is an example block diagram illustrating an operation of the semiconductor system of FIG. 1 according to some example embodiments.

Referring to FIGS. 1 and 3, the RAM 120 may store the RAM cache area 122 in which a plurality of memory management tables 121 and a plurality of pages are stored, a timestamp table 123 in which a plurality of timestamps are stored, a master timestamp 124 performing a timestamp function for all pages, and a master tag 125 performing a tag function for all pages.

In the memory management tables 121, a memory management table for each software is stored. For example, a zeroth memory management table for a zeroth software MMT #0, a first memory management table for a first software MMT #1, and/or an n-th memory management table for an n-th software MMT #n may be stored in the memory management table 121.

Pages used by each software executed by the CPU 110 may be stored in the RAM cache area 122. For example, in the RAM cache area 122, a zeroth page Page #0, a first page Page #1, and/or an n-th page Page #n used by the zeroth software executed by the CPU 110 may be stored.

The timestamp table 123 may store timestamps used when encryption is performed on each of the pages stored in the RAM cache area 122. For example, in the timestamp table 123, a zeroth timestamp Timestamp #0 used to encrypt the zeroth page Page #0, a first timestamp Timestamp #1 used to encrypt the first page Page #1, and/or an n-th timestamp Timestamp #n used to encrypt the n-th page Page #n may be stored.

The master timestamp 124 may be used for an encryption operation performed when the timestamp table 123 is swapped out to the first memory 30. In addition, the master timestamp 124 is not limited thereto, and may be used for an encryption operation performed when the RAM cache area 122 is swapped out to the first memory 30.

The master tag 125 is not limited thereto, and may be used for an encryption operation performed when the timestamp table 123 is swapped out to the first memory 30. In addition, the master tag 125 is not limited thereto, and may be used for an encryption operation performed when the RAM cache area 122 is swapped out to the first memory 30.

That is, when the information (e.g., the memory management table 121 and the RAM cache area 122) used by software operating in the secure zone S/Z is swapped out to the first memory 30, encryption for each piece of information must be performed. Encryption may be performed through an encryption/decryption engine. The swap-out operation will be described with reference to FIG. 4.

Figure 4:
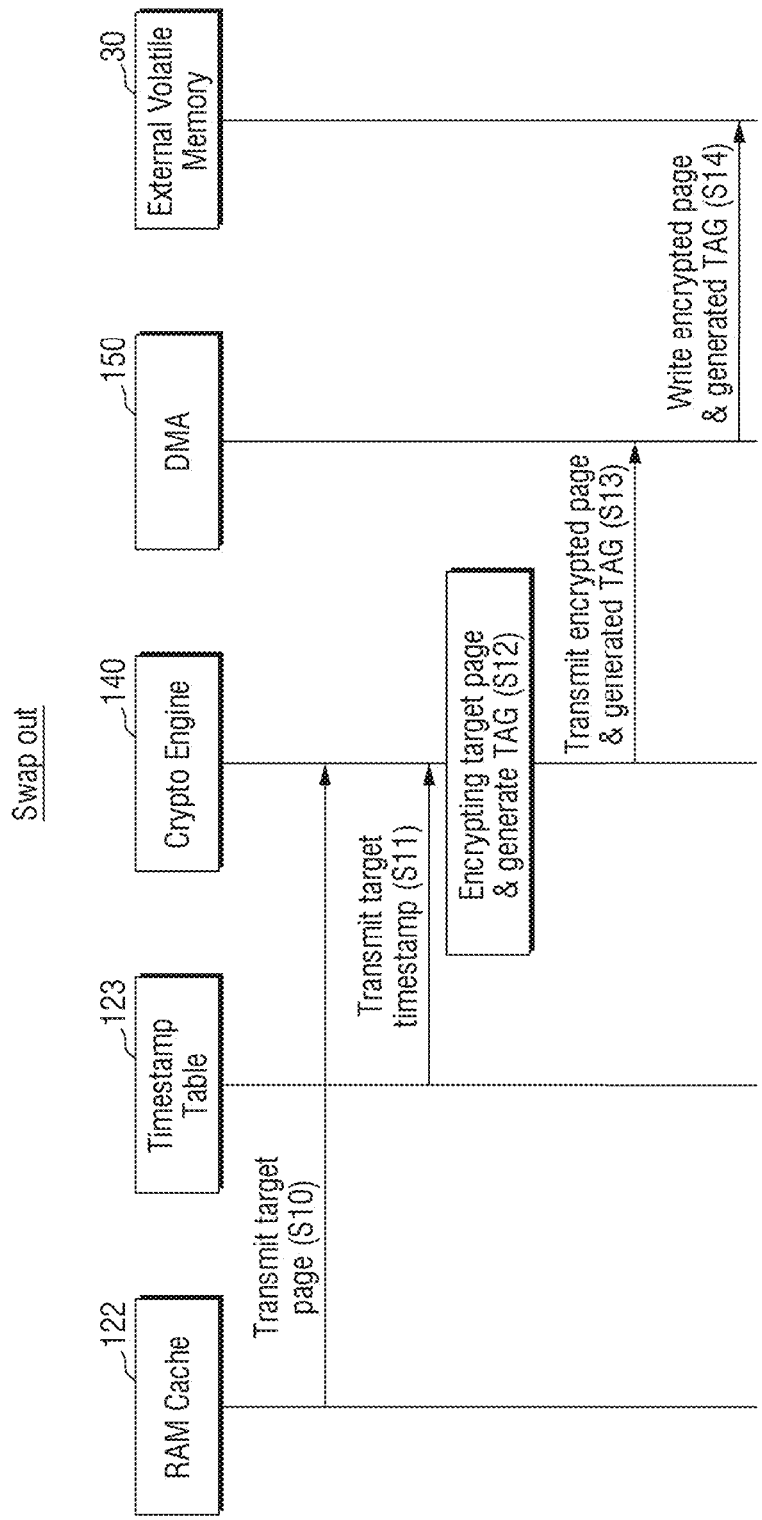
FIG. 4 is an example ladder diagram describing a swap-out operation of the semiconductor system of FIG. 1 according to some example embodiments.

FIG. 4 is an example ladder diagram describing a swap-out operation of the semiconductor system of FIG. 1 according to some example embodiments.

Referring to FIGS. 1, 3, and 4, for example, a case is described on the assumption that the zeroth software executed in the secure zone S/Z is operated using the first memory 30.

In the first memory 30, the zeroth memory management table 121 for the zeroth software encrypted through the encryption/decryption engine 140 may be stored in a memory management table backup area 300 in the first memory 30 through the DMA module 150.

In addition, target pages used to execute the zeroth software may be encrypted and stored in a swap region 310 in the first memory 30, and tags generated in the encryption process may be stored in the tag table area 320 in the first memory 30. This operation will be described in detail.

FIG. 4 is a ladder diagram describing a swap-out process, and a description of an operation in which the memory management table is swapped out in the first memory 30 is omitted.

Pages to be swapped out are transmitted from the RAM cache area 122 to the encryption/decryption engine 140 (step S10). In addition, timestamps used for encryption of pages to be swapped out are also transmitted from the timestamp table 123 to the encryption/decryption engine 140 (step S11). The order of the steps S10 and S11 is not limited to this figure. For example, the step S10 and the step S11 may occur simultaneously, and the step S11 may be performed before the step S10.

The encryption/decryption engine 140 uses pages to be swapped out and timestamps used for encryption of the pages (without being limited thereto, the key stored in the ROM 130 and/or an initial vector IV may be further used), to encrypt the pages to be swapped out (step S12). In this case, tags (or may be MAC or HASH, but is not limited thereto, and hereinafter will be described as tags) corresponding to the pages to be encrypted may be generated. The pages encrypted by the encryption/decryption engine 140 and the generated tags are transmitted to the DMA module 150 connected to the encryption/decryption engine 140 (step S13). The DMA module 150 may write the encrypted pages and the generated tags to the first memory 30 (step S14). Through this, a swap-out operation may be completed. The step S12, the step S13, and the step S14 may proceed simultaneously.

Encrypted pages written in the first memory 30 may be written in the swap region 310 of the first memory 30. In addition, the generated tags written in the first memory 30 may be written in the tag table area 320.

That is, the memory management table of the zeroth software may be backed up in the memory management table backup area 300 of the first memory 30. In addition, pages used to execute the zeroth software are encrypted and stored in the swap region 310. In addition, tags generated when pages used to execute the zeroth software are encrypted are stored in the tag table area 320.

The above-described swap-out operation will be described with reference to a flowchart of FIG. 5.

Figure 5:
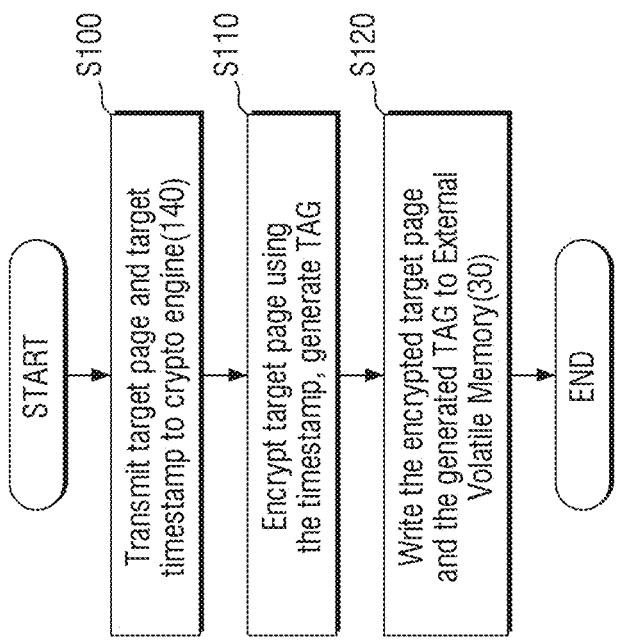
FIG. 5 is an example flowchart describing a swap-out operation of the semiconductor system of FIG. 1 according to some example embodiments.

FIG. 5 is an example flowchart describing a swap-out operation of the semiconductor system of FIG. 1 according to some example embodiments.

Referring to FIGS. 1, 3, and 5, pages to be swapped out are transmitted from the RAM cache area 122 to the encryption/decryption engine 140, and timestamps used for encryption of the pages to be swapped out are also transmitted from the timestamp table 123 to the encryption/decryption engine 140 (step S100).

The encryption/decryption engine 140 encrypts the pages to be swapped out by using the pages to be swapped out and the timestamps used for encryption of the pages, and a tag corresponding to each of the pages to be encrypted is generated (step S110).

The DMA module 150 may write the encrypted pages and the generated tags to the first memory 30 (step S120). Through this, a swap-out operation may be completed. As described above, the step S110 and the step S120 may be performed simultaneously.

Hereinafter, in FIG. 6, an operation of swapping in the encrypted memory management table backed up in the memory management table backup area 300 of the first memory 30 and the encrypted pages written in the swap region 310, into the RAM 120, will be described. The encrypted memory management table backed up in the memory management table backup area 300 may be decrypted through the encryption/decryption engine 140 and swapped in to the memory management table 121 of the RAM 120. A swap-in operation of an encrypted page will be described in detail with reference to FIGS. 6 and 7.

Figure 6:
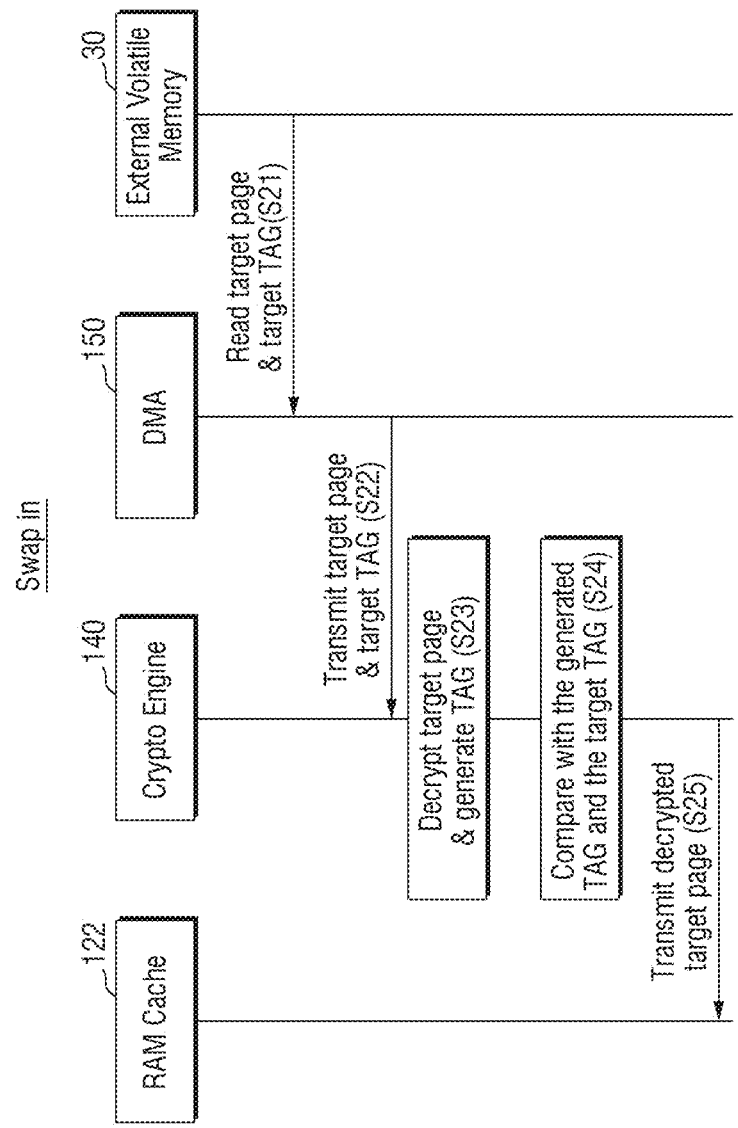
FIG. 6 is an example ladder diagram describing a swap-in operation of the semiconductor system of FIG. 1 according to some example embodiments.

FIG. 6 is an example ladder diagram describing a swap-in operation of the semiconductor system of FIG. 1 according to some example embodiments.

Hereinafter, a description of swap-in will be described by assuming a case where a page used by software to be executed by the CPU 110 is not in the RAM cache area 122.

Referring to FIGS. 1, 3, and 6, an encrypted page to be swapped in from the first memory 30 and tags corresponding to the encrypted page are read through the DMA module 150 (step S21). The DMA module 150 transmits the encrypted page and the tags corresponding to the encrypted page to the encryption/decryption engine 140 connected to the DMA module 150 (step S22). The encryption/decryption engine 140 decrypts the encrypted pages, and a tag is generated as a result of the decryption (step S23). In this case, in the decryption process, the timestamps used in the step S12 of FIG. 4 may be used (without being limited thereto, a key and/or an initial vector (IV), or the like used in the step S12 of FIG. 4 may be further used). It is not limited thereto, and the step S21, the step S22, and the step S23 may be performed simultaneously. Thereafter, the encryption/decryption engine 140 compares the tag generated in the step S23 with the tag written in the tag table area 320 of the first memory 30 to verify security (step S24). When the security is verified in the step S24, pages to be swapped in are read from the encryption/decryption engine 140 to the RAM cache area 122 (step S25). Through this, a swap-in operation may be completed. The step S24 according to some example embodiments may be performed after the step S25.

The above-described swap-in operation will be described with reference to the flowchart of FIG. 7.

Figure 7:
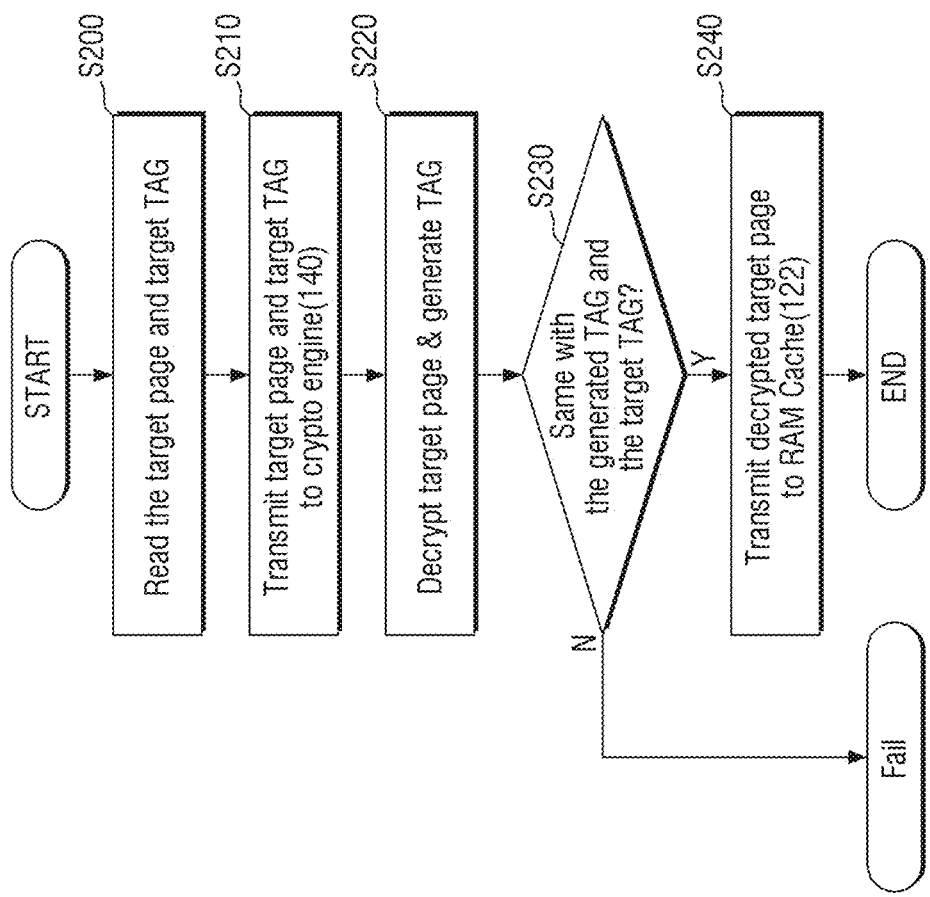
FIG. 7 is an example flowchart describing a swap-in operation of the semiconductor system of FIG. 1 according to some example embodiments.

FIG. 7 is an example flowchart describing a swap-in operation of the semiconductor system of FIG. 1 according to some example embodiments.

Referring to FIGS. 1, 3, and 7, an encrypted page to be swapped in from the first memory 30 and tags corresponding to the encrypted page are read through the DMA module 150 (step S200). The DMA module 150 transmits the encrypted page and the tags corresponding to the encrypted page to the encryption/decryption engine 140 connected to the DMA module 150 (step S210). The encryption/decryption engine 140 decrypts the encrypted pages, and a tag is generated as a result of the decryption (step S220). In this case, in the decryption process, the timestamps used in the step S110 of FIG. 5 may be used (without being limited thereto, a key and/or an initial vector (IV), or the like used in the step S110 of FIG. 5 may be further used). It is not limited thereto, and the step S200, the step S210, and the step S220 may be performed simultaneously. Thereafter, the encryption/decryption engine 140 compares the tag generated in the step S220 with the tag written in the tag table area 320 of the first memory 30 to verify security (step S230). For example, if the tag generated through the step S220 is different from the tag written in the tag table area 320 (N), the security of the data is not verified, and access to the secure zone S/Z is blocked (Fail). If the tag generated through the step S220 is the same as the tag written in the tag table area 320 (Y), the security of the data is verified, and the pages to be swapped in are transmitted from the encryption/decryption engine 140 to the RAM cache area 122 (step S240). The step S230 according to some example embodiments may be performed after the step S240. Through this, a swap-in operation may be completed.

Hereinafter other embodiments will be described by omitting descriptions that overlap with the above descriptions for the sake of simplicity of description.

Figure 8:
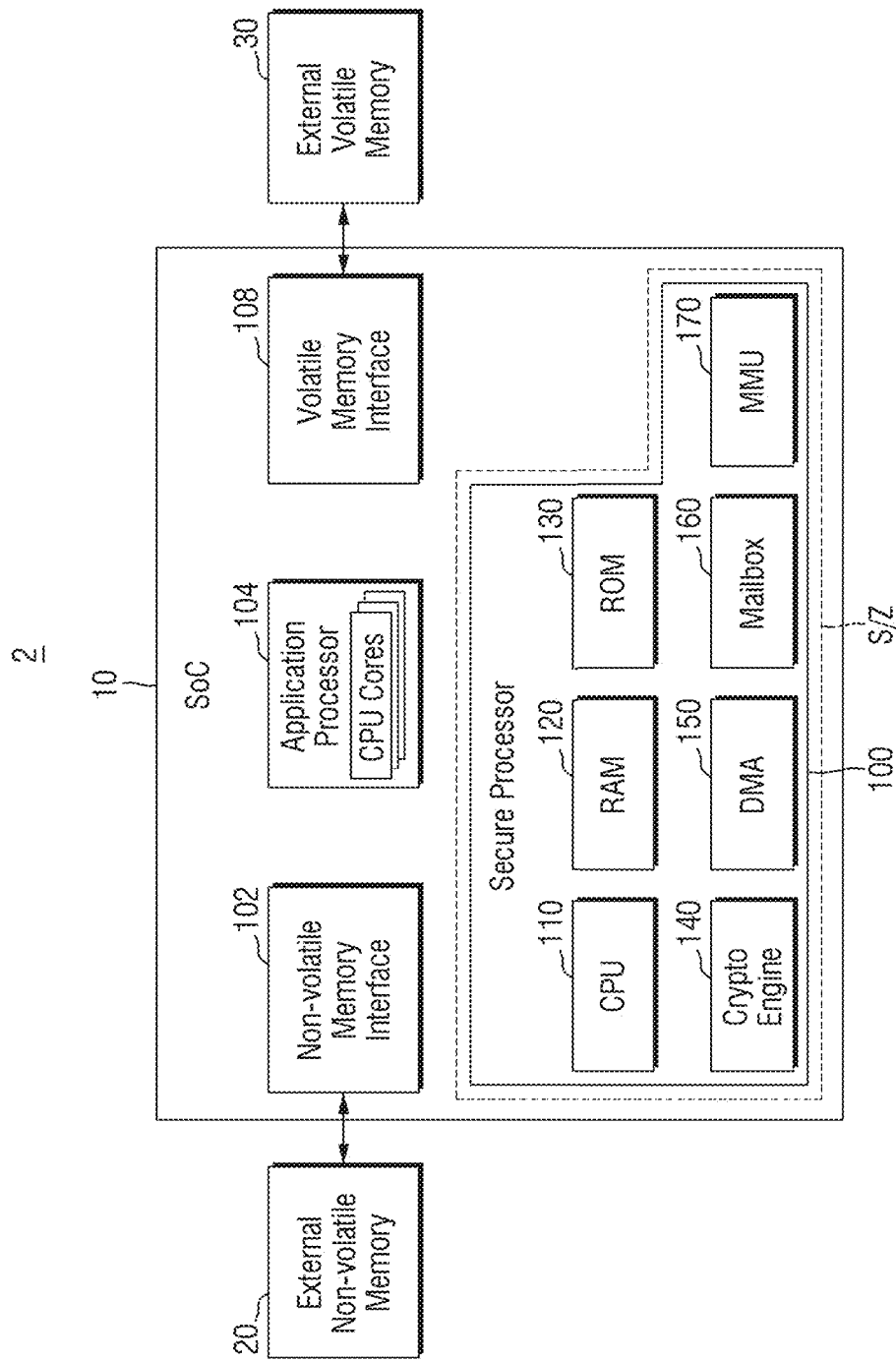
FIG. 8 is an example diagram illustrating another semiconductor system including a system on chip including a secure processor according to some example embodiments.

FIG. 8 is an example diagram illustrating another semiconductor system including a system on chip including a secure processor according to some example embodiments.

Figure 9:
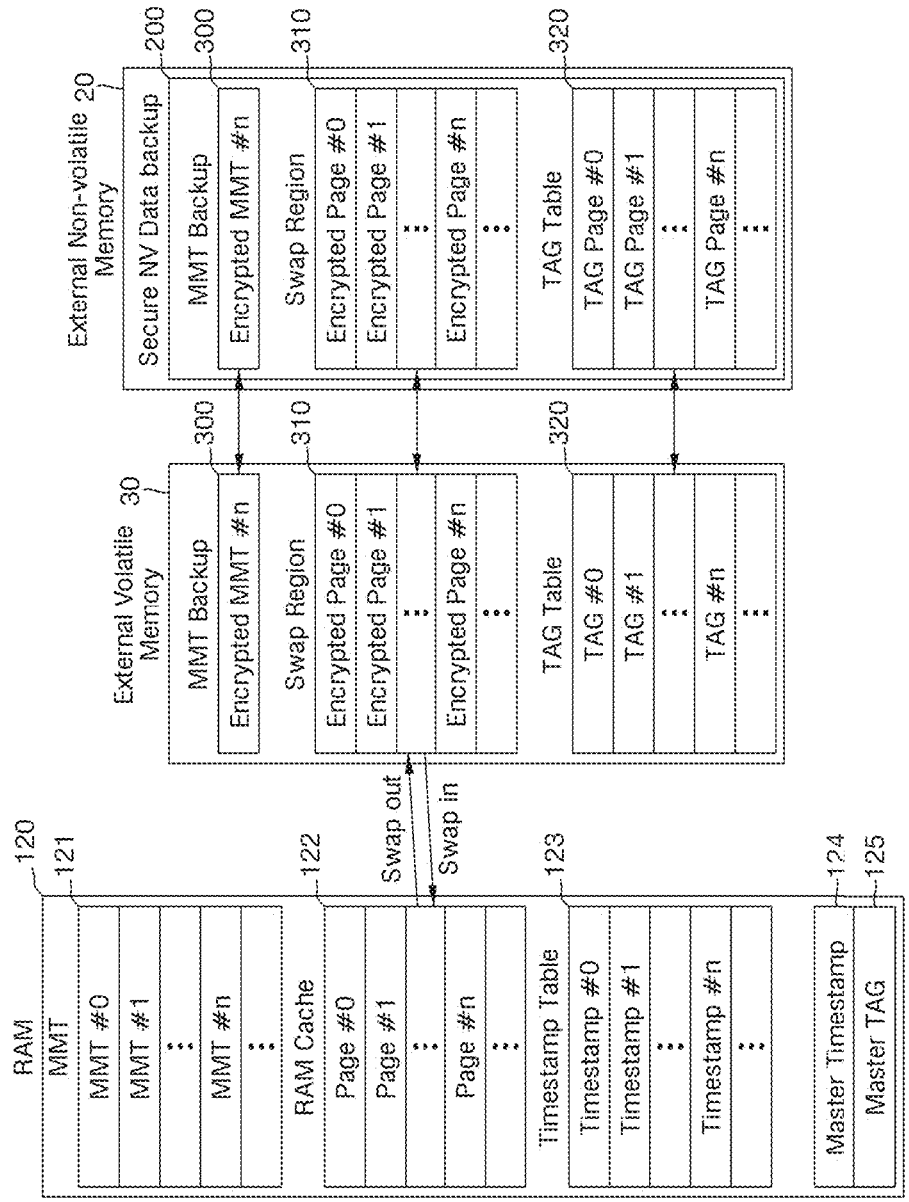
FIG. 9 is an example block diagram illustrating an operation of the semiconductor system of FIG. 8 according to some example embodiments.

FIG. 9 is an example block diagram illustrating an operation of the semiconductor system of FIG. 8 according to some example embodiments.

Referring to FIGS. 8 and 9, another semiconductor system 2 according to some example embodiments further includes another external memory (e.g., a second memory 20) disposed outside the system on chip 10. Hereinafter, another external memory will be described as the second memory 20. The second memory 20 may be a non-volatile memory, for example, NAND FLASH.

Another system on chip 10 according to some example embodiments further includes a second memory interface 102 in communication with the second memory 20.

The RAM 120 may further use the second memory 20 in addition to using the first memory 30 described with reference to FIGS. 1 to 7 when executing software larger than the size of the RAM 120.

In more detail, the entirety of the memory management table backup area 300, the swap region 310, and the tag table area 320 that are swapped out to the first memory 30 may be stored in a secure non-volatile data backup area 200 of the second memory 20. Conversely, after reading information stored in the secure non-volatile data backup area 200 of the second memory 20 into the first memory 30, a swap-in operation may be performed. This will be described through the ladder diagrams of FIGS. 10 and 11.

Figure 10:
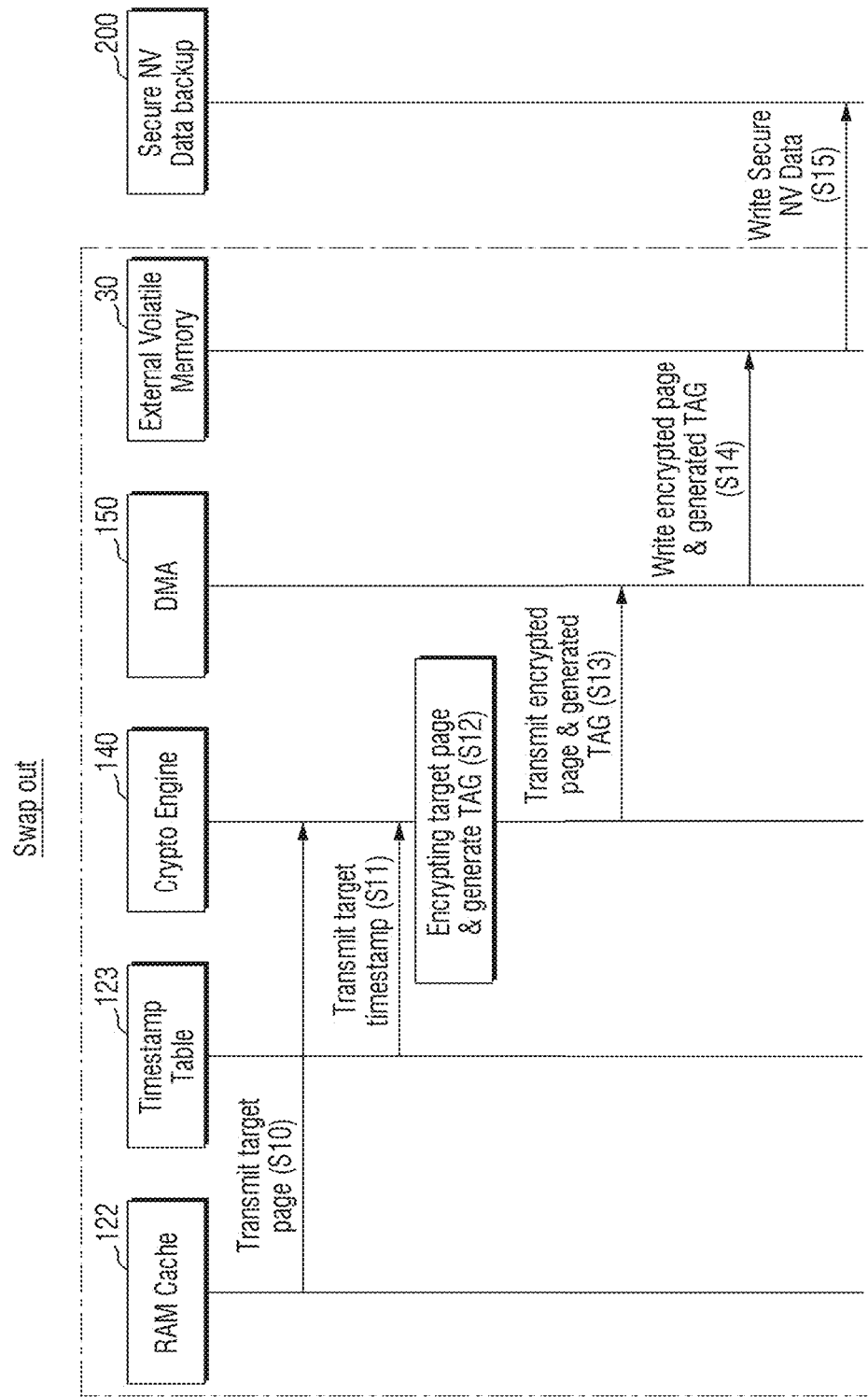
FIGS. 10 and 11 are example ladder diagrams describing an operation of the semiconductor system of FIG. 8 according to some example embodiments.
Figure 11:
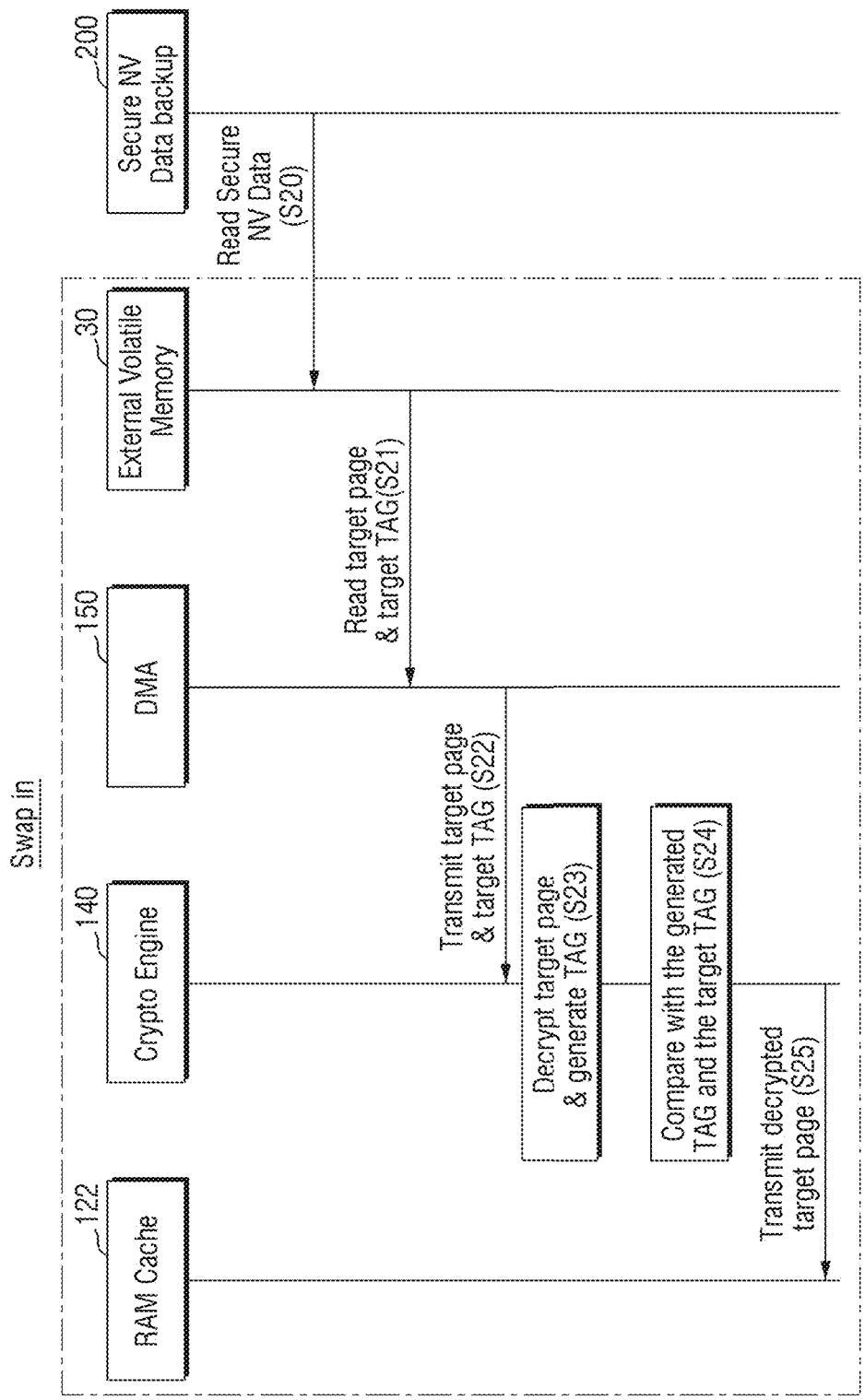

FIGS. 10 and 11 are example ladder diagrams describing an operation of the semiconductor system of FIG. 8 according to some example embodiments.

Referring to FIGS. 8 to 10, the entirety of the swap region 310, the memory management table backup area 300, and the tag table area 320 that are swapped out from the RAM 120 to the first memory 30 may be written in the secure non-volatile data backup area 200 (step S15). Information written from the first memory 30 to the secure non-volatile data backup area 200 may be collectively referred to as secure non-volatile data.

Referring to FIGS. 8, 9, and 11, the first memory 30 may read the entirety of the swap region 310, the memory management table backup area 300, and the tag table area 320, from the secure non-volatile data backup area 200 of the second memory 20 (step S20). Thereafter, pages of the first memory 30 may be swapped in to the secure zone S/Z.

Figure 12:
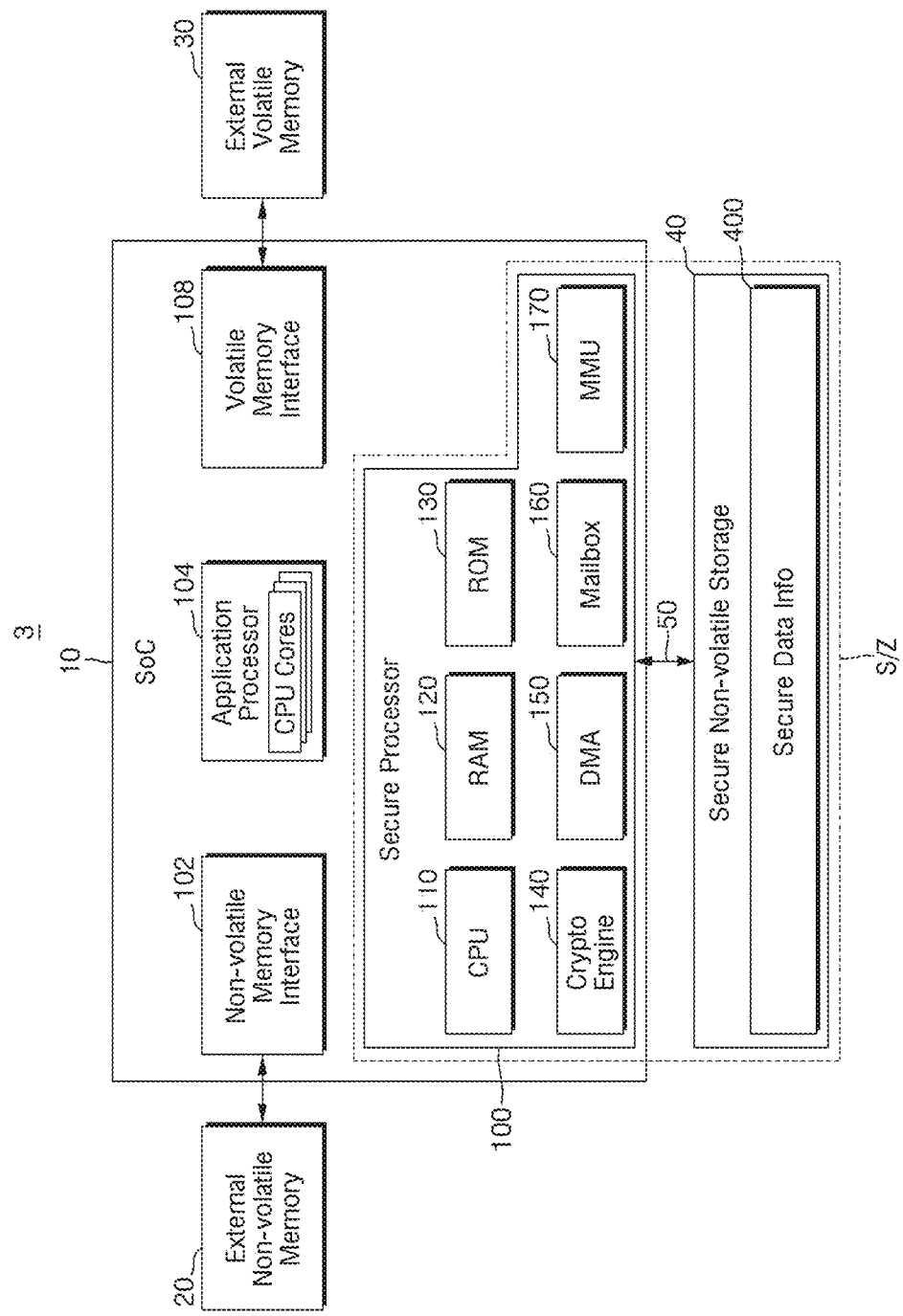
FIG. 12 is an example diagram illustrating another semiconductor system including a system on chip including a secure processor according to some example embodiments.

FIG. 12 is an example diagram illustrating another semiconductor system including a system on chip including a secure processor according to some example embodiments.

Another semiconductor system 3 according to some example embodiments further includes another external memory (e.g., a secure non-volatile storage 40) disposed outside the system on chip 10. The secure non-volatile storage 40 may be a non-volatile memory, for example, NAND FLASH.

The secure non-volatile storage 40 may communicate with the secure processor 100 through a secure channel 50. Accordingly, the secure non-volatile storage 40 may also be included in the secure zone S/Z. For example, the secure non-volatile storage 40 may utilize the secure processor 100 and a shared key, and the security of data transmitted between the secure non-volatile storage 40 and the secure processor 100 may be ensured through the cryptographic algorithms described above (e.g., AES, AES-GCM, DES, Triple DES, SEED, HIGHT, ARIA, or LEA, or a hash-based message authentication code algorithm). The DMA 150 may be configured to send the master timestamp and the master tag to a secure data information area of a secure non-volatile storage 40 via the secure channel 50.

The secure non-volatile storage 40 may store security-related information in a secure data information area 400 in preparation for a situation in which the secure processor 100 is powered off. This will be described in detail with reference to FIG. 13.

Figure 13:
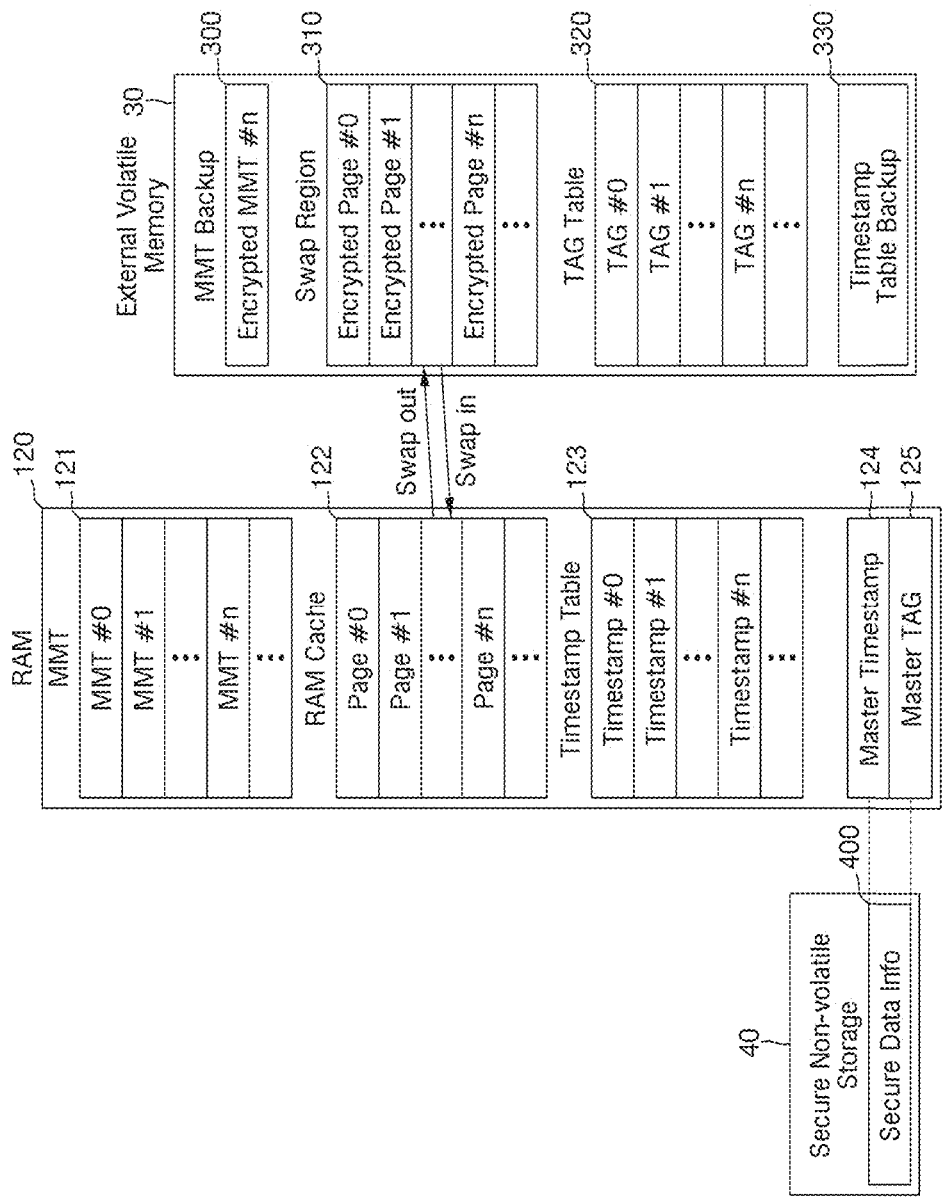
FIG. 13 is an example block diagram illustrating an operation of the semiconductor system of FIG. 12 according to some example embodiments.

FIG. 13 is an example block diagram illustrating an operation of the semiconductor system of FIG. 12 according to some example embodiments.

Referring to FIGS. 12 and 13, the master timestamp 124 and the master tag 125 may be stored in the secure data information area 400 in the secure non-volatile storage 40. The secure data information area 400 will be described in more detail with reference to FIG. 14.

FIG. 14 is an example diagram describing a secure data information area.

Referring to FIGS. 12 to 14, the secure data information area 400 includes security data information for each software executed by the CPU 110.

In more detail, the secure data information area 400 stores a universally unique identifier (UUID) for each software, active set information, different types of master timestamps (a master timestamp A and a master timestamp B), and different types of master tags (e.g., a master tag A and a master tag B).

Each software has a different universally unique identifier (UUID). Accordingly, the CPU 110 may identify the software being executed through a universal unique identifier (UUID).

The active set information may indicate what type of master timestamp and master tag for each software is. For example, when the active set information activates A, the master timestamp currently used by the software becomes the master timestamp A, and the master tag currently used by the software becomes the master tag A. Similarly, when the active set information activates B, the master timestamp currently used by the software becomes the master timestamp B, and the master tag currently used by the software becomes the master tag B.

The types of master timestamps and master tags stored for each software in the secure data information area 400 are not limited thereto, and may have a master timestamp C and a master tag C.

Referring to FIGS. 12 and 13 again, the timestamp table area 123 of the RAM 120 may be encrypted and backed up in the timestamp table backup area 330 of the first memory 30. In more detail, when the encryption/decryption engine 140 encrypts the timestamp table area 123 of the RAM 120, encryption may be performed using the master timestamp 124.

When the secure processor 100 and/or the system on chip is powered off, and when the secure processor 100 and/or the system on chip is powered on, an operation in which the secure processor 100 utilizes the first memory 30 will be described with reference to FIGS. 15 and 16.

Figure 15:
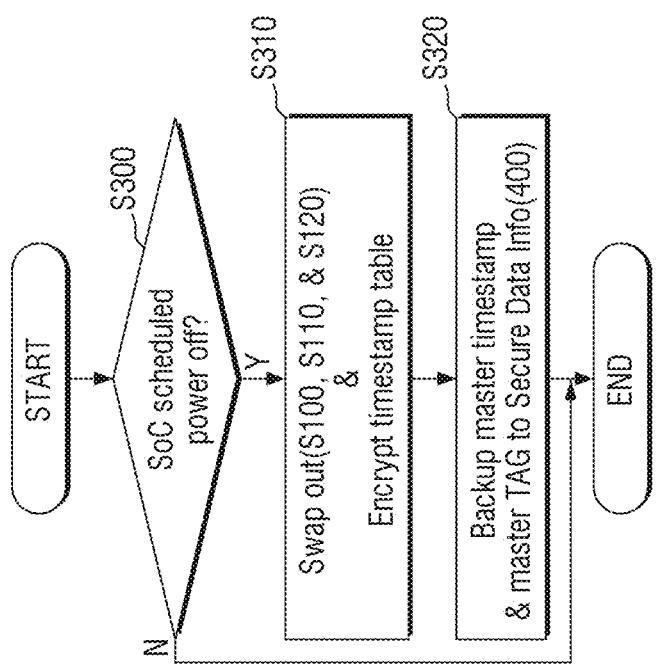
FIGS. 15 and 16 are example flowcharts describing the operation of FIG. 13.
Figure 16:
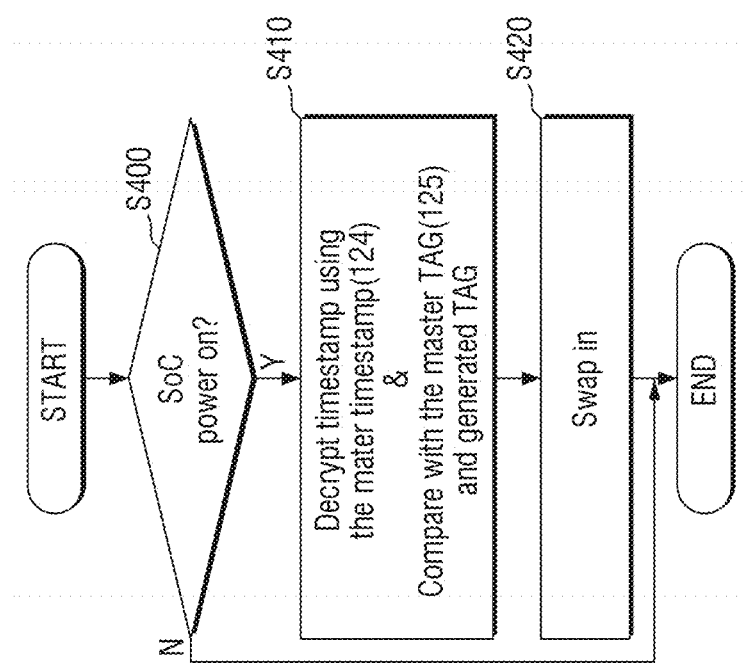

FIGS. 15 and 16 are example flowcharts describing the operation of FIG. 13.

First, referring to FIGS. 12, 13, and 15, it is determined whether the RAM 120, the secure processor 100 and/or the system on chip are scheduled to be powered off (step S300). If the power-off of the RAM 120, the secure processor 100, and/or the system on chip is not scheduled (N), the secure processor 100 does not perform an additional operation. If the power-off of the RAM 120, the secure processor 100, and/or the system on chip is scheduled (Y), the swap-out operation described with reference to FIG. 5 is performed, and the timestamp table area 123 stored in the RAM 120 is encrypted and transmitted to the first memory 30 (step S310). Thereafter, the master timestamp 124 and the master tag 125 of the RAM 120 are backed up in the secure data information area 400 (step S320). In the operation of the semiconductor system according to some example embodiments, the order of the step S320 and the step S310 may be interchanged.

Referring to FIGS. 12, 13, and 16, it is checked whether the RAM 120, the secure processor 100, and/or the system on chip is powered on (step S400). If the RAM 120, the secure processor 100, and/or the system on chip are not powered on (N), the RAM 120, the secure processor 100, and/or the system on chip do not perform an additional operation. If the RAM 120, the secure processor 100, and/or the system on chip is powered on (Y), the master timestamp 124 of the RAM 120 is used to decrypt the encrypted timestamp backed up in the timestamp table backup area 330 of the first memory 30, and the tag generated in this process is compared with the master tag 125. At this time, the security is verified by determining whether the tag generated in the decryption process is identical to the master tag 125 (step S410). For example, when it is determined that the tag generated in the decryption process is identical to the master tag 125, it is recognized that the security is verified. Thereafter, a swap-in is performed from the first memory 30 to the RAM 120 (step S420).

Figure 17:
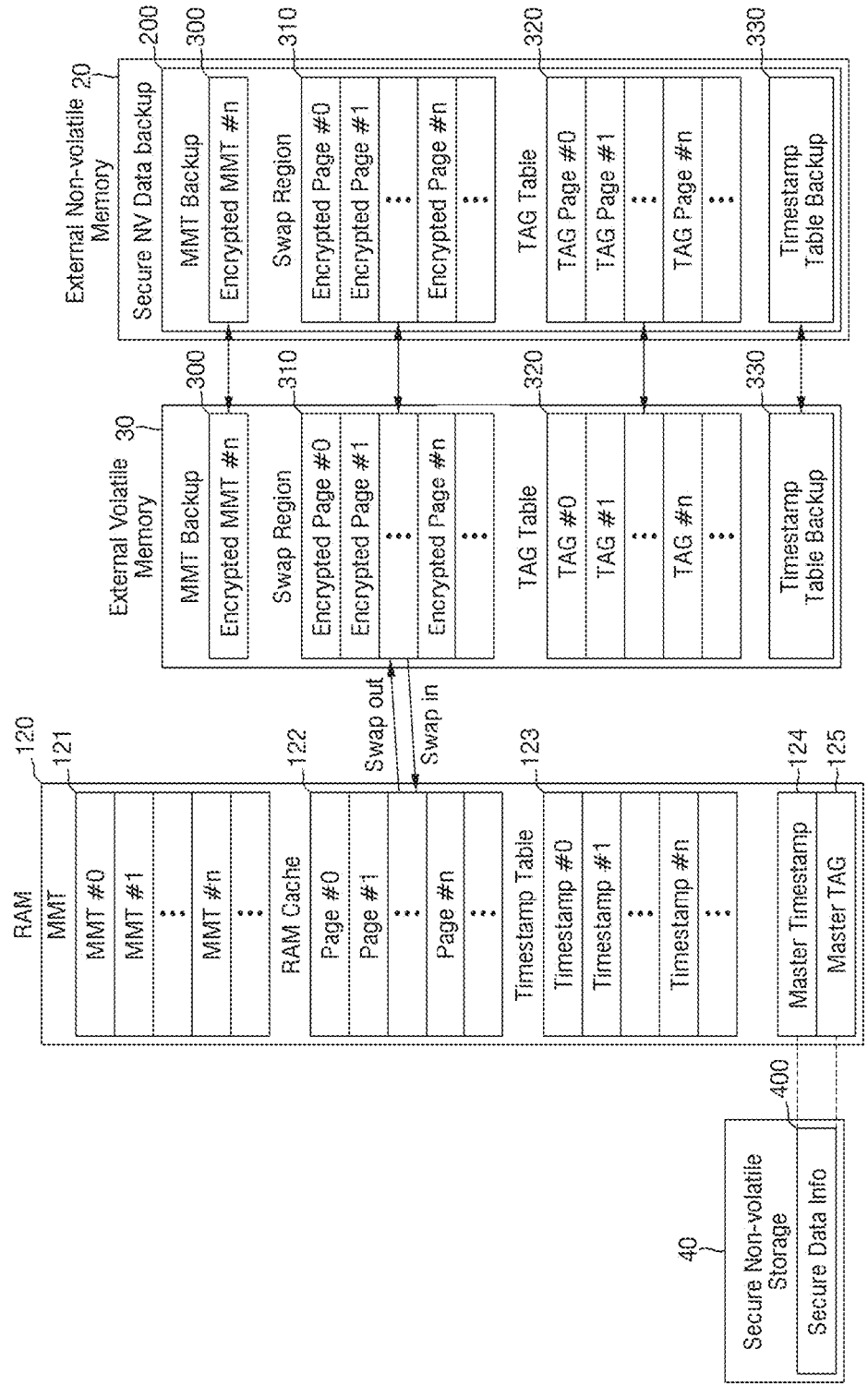
FIG. 17 is another example block diagram illustrating an operation of the semiconductor system of FIG. 12 according to some example embodiments.

FIG. 17 is another example block diagram illustrating an operation of the semiconductor system of FIG. 12 according to some example embodiments.

Referring to FIGS. 12 and 17, another semiconductor system 3 according to some example embodiments may store the entirety of the memory management table backup area 300, the swap region 310, the tag table area 320, and the timestamp backup area 330 that are swapped out to the first memory 30, in the secure non-volatile data backup area 200 of the second memory 20. Conversely, after reading information stored in the secure non-volatile data backup area 200 of the second memory 20 into the first memory 30, a swap-in operation may be performed. The first memory interface 108 and the second memory interface 102 may be configured to communicate based on commands from the application processor 104 to back up the swap area, the tag table area, and the time stamp backup area of the first memory 30 in the second memory 30.

For example, when the secure processor 100, the system on chip, and/or the semiconductor system is powered off, and when the secure processor 100, the system on chip, and/or the semiconductor system is powered on, the operation in which the secure processor 100 utilizes the first memory 30 and the second memory 20 will be described with reference to FIGS. 18 and 19. Hereinafter, the case of power-off and/or power-on of the semiconductor system will be described as an example.

Figure 18:
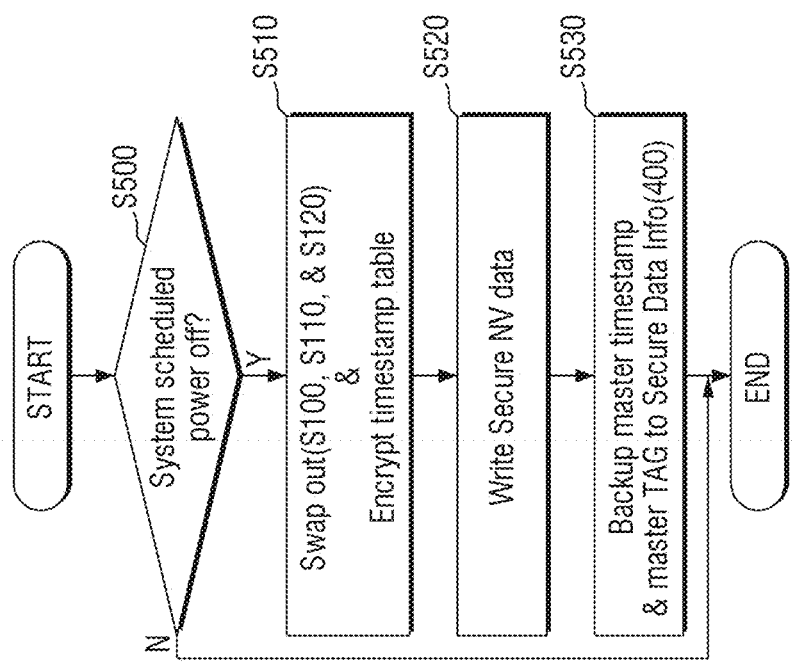
FIGS. 18 and 19 are example flowcharts describing the operation of FIG. 17.
Figure 19:
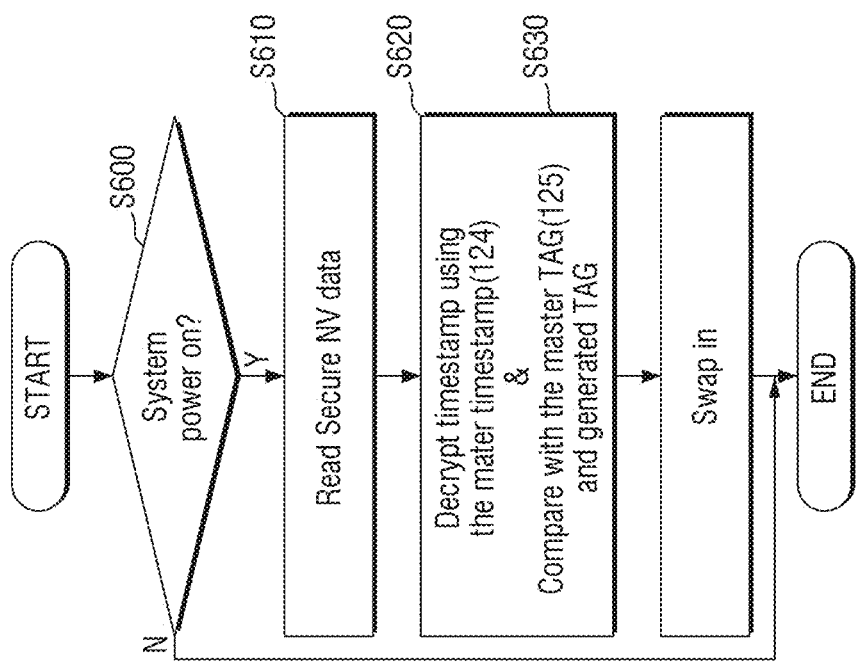

FIGS. 18 and 19 are example flowcharts describing the operation of FIG. 17.

Referring to FIGS. 12, 13, and 18, it is determined whether the power-off of the semiconductor system is scheduled (step S500). When the power-off of the semiconductor system is not scheduled (N), the semiconductor system does not perform an additional operation. If the power-off of the semiconductor system is scheduled (Y), the swap-out operation described with reference to FIG. 5 is performed, the timestamp table area 123 stored in the RAM 120 is encrypted, and is transmitted to the first memory 30 (step S510). Thereafter, as described with reference to FIG. 9, the entirety of the memory management table backup area 300, the swap region 310, and the tag table area 320 that are swapped out to the first memory 30 are stored in the secure non-volatile data backup area 200 of the second memory 20 (step S520). Thereafter, the master timestamp 124 and the master tag 125 are backed up in the secure data information area 400 (step S510). In the operation of the semiconductor system according to some example embodiments, the order of the step S520 and the step S530 may be interchanged.

Referring to FIGS. 12, 13, and 19, it is determined whether the semiconductor system is powered on (step S600). If the semiconductor system is not powered on (N), the semiconductor system does not perform an additional operation. If the semiconductor system is powered on (Y), the first memory 30 reads data written in the secure non-volatile data backup area 200 (step S610). Thereafter, the encrypted timestamp backed up in the timestamp table backup area 330 of the first memory 30 is decrypted using the master timestamp 124 of the RAM 120. In addition, the master tag 125 is compared with the tag generated in the decryption process, so that the security is verified by determining whether they are identical to each other (step S620). For example, when the tag generated in the decryption process is compared with the master tag 125 and they are identical to each other, it may be determined that the security is verified. Thereafter, a swap-in is performed from the first memory 30 to the RAM 120 (step S630).

The secure data information area 400 and the timestamp table backup area 330 described above in FIGS. 12 to 19, not only may be used in situations of the power-on and the power-off of the RAM 120, the secure processor 100, the system on chip, and/or the semiconductor system, but also may be used in any situation when necessary.

Figure 20:
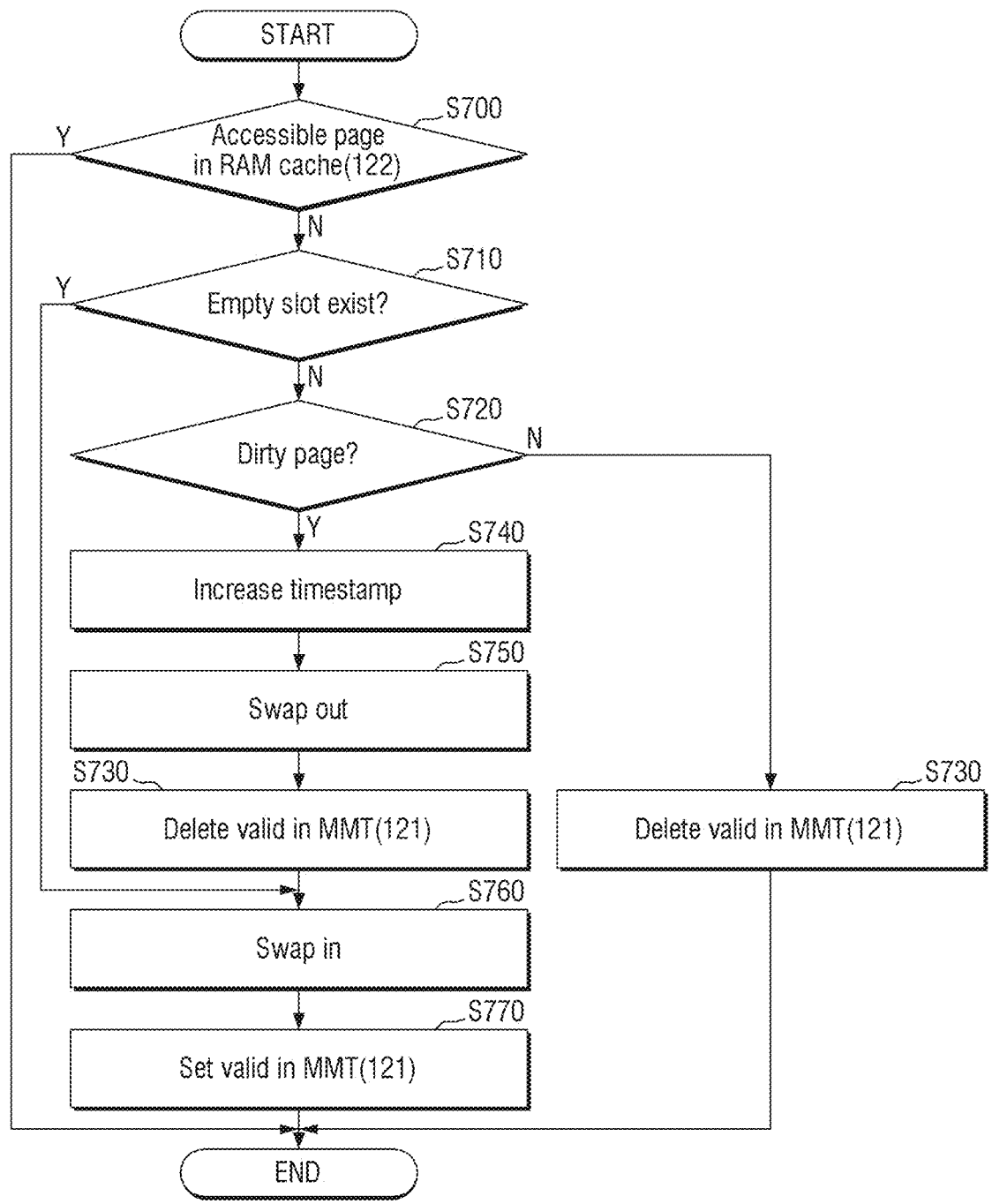
FIGS. 20 to 22 are example flowcharts describing an operation of a semiconductor system according to some example embodiments.
Figure 21:
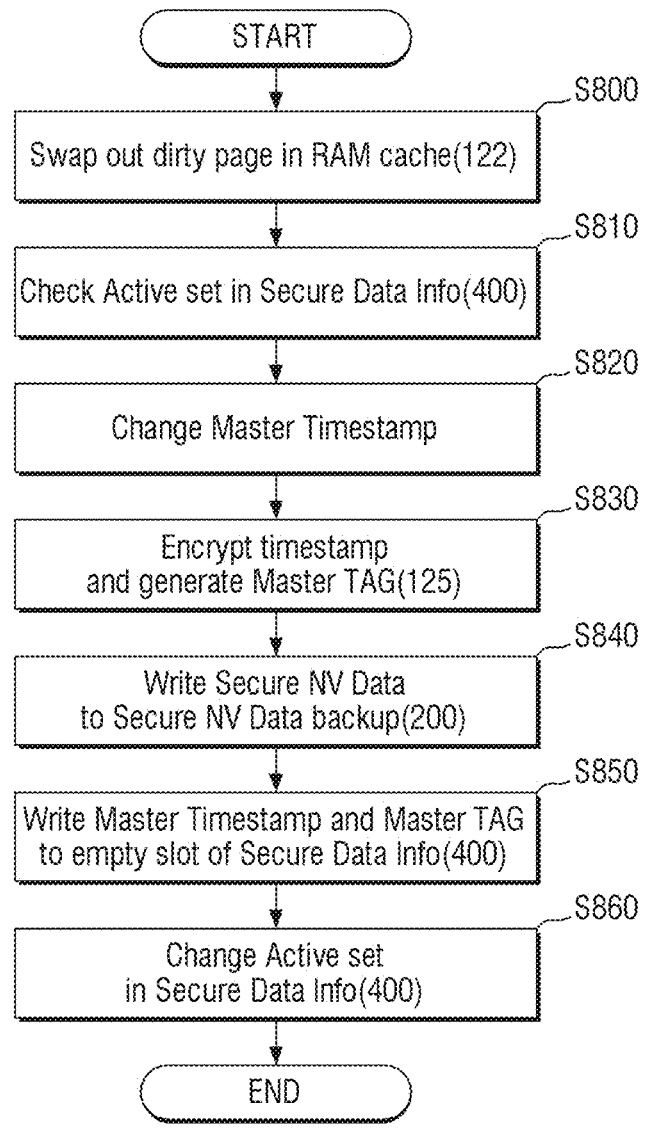
Figure 22:
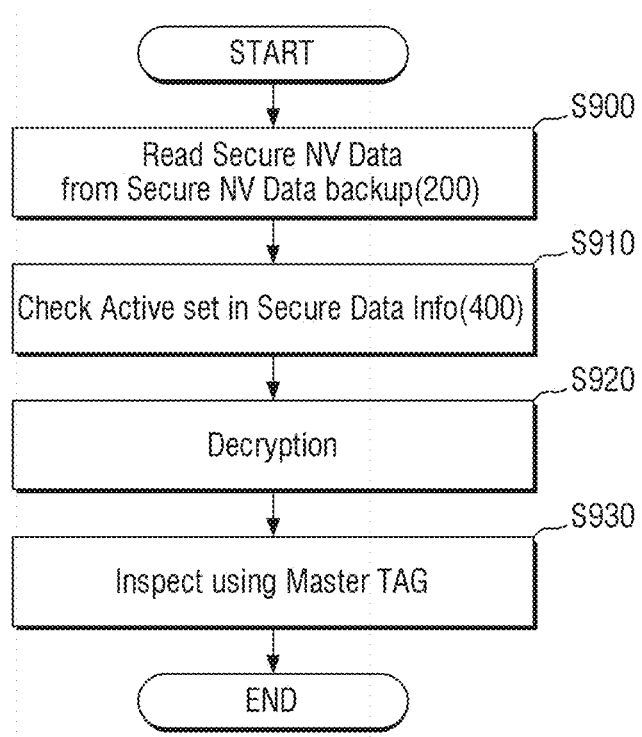

FIGS. 20 to 22 are example flowcharts describing an operation of a semiconductor system according to some example embodiments.

An operation of the semiconductor system when the CPU 110 executes software larger than the size of the RAM 120 will be exemplarily described with reference to FIGS. 12, 13, and 20.

First, it is determined whether a page used by software executed by the CPU 110 exists in the RAM cache area 122 (step S700). In the following description, it is assumed that the page used by the software executed by the CPU 110 is the first page.

In more detail, the virtual address of the first page to be accessed is transmitted to the memory management table, and an access attempt is made to the physical address of the first page corresponding to the received virtual address. If the corresponding first page exists in the RAM cache area 122 (Y), that is, when the first page is accessible, the swap-in and swap-out operations are not performed.

In this case, for example, when the operation executed by the CPU 110 is a write operation on the first page, the dirtiness information on the first page Page #1 of the memory management table of FIG. 2 may be set to dirty.

In the step S700, if it is determined that the first page does not exist in the RAM cache area 122 (N), it may be determined that the first page is backed up in the swap region 310. That is, the CPU 110 has to swap in the first page backed up in the swap region 310 to the secure zone S/Z (e.g., the RAM cache area 122) in order to access the first page. At this time, it is determined whether there is an empty slot in which the first page may be swapped in, in the RAM cache area 122 (step S710).

If it is determined that there is no empty slot (N), it is determined whether a slot to be swapped in or a page of a slot to which a page is to be swapped in is a dirty page (step S720). Whether a page to be swapped in to the RAM cache area 122 is dirty may be determined by checking dirtiness of each page stored in the memory management table 121 as described with reference to FIG. 2.

If it is determined that a slot to be swapped in to the RAM cache area 122 or a page of a slot to which a page is to be swapped in is dirty (Y), the timestamp stored in the timestamp table area 123 corresponding to the page to be swapped in is incremented (step S740). Thereafter, the page to be swapped in is encrypted using the timestamp increased through the step S740, the key, and the initial vector, and swapped out (step S750). The step S750 may be performed on the fly.

When a page to be swapped in is swapped out through the step S740 and the step S750 or it is determined the page is not dirty (N) as a result of determination through the step S720, the validity of the page to be swapped in is updated to be invalid in the memory management table 121 of FIG. 2. For example, it is updated to indicate that the page is not valid by deleting "Valid" indicating validity (step S730).

Thereafter, if it is determined that the page to be swapped in to the RAM cache area 122 is an empty slot through the step S710 (Y), or after the page to be swapped in to the RAM cache area 122 is secured through the step S740 and the step S750, the first page is swapped in (step S760).

In this case, when it is determined that the page to be swapped in is not dirty through the step S720 (N), and then the step S730 of updating the memory management table is performed, the operations after the step S760 are not performed. If it is determined that the page to be swapped in is not dirty through the step S720 (N), it means that there is no update since the first page is swapped in to the RAM cache area 122, and this is because there is no need for a swap operation.

Thereafter, if it is determined that the page to be swapped in to the RAM cache area 122 is an empty slot through the step S710 (Y), or after the page to be swapped in to the RAM cache area 122 is secured through the step S740 and the step S750, the step S760 is performed, and then the validity of the page to be swapped in is updated to be valid, at S770, in the memory management table of FIG. 2. For example, it may be set to "Valid" indicating validity.

An embodiment of a method of storing data of software used in the secure zone S/Z in the second memory 20 will be described with reference to FIGS. 12, 17, and 21.

First, all pages that are dirty among pages of the RAM cache area 122 are swapped out to the swap region 310 (step S800). That is, pages changed by the secure processor 100 or changes not yet reflected in the swap region 310 are reflected in the first memory 30 through a swap-out operation.

Thereafter, the timestamp table area 123 of the RAM 120 is swapped out to the timestamp table backup area 330 of the first memory 30, and in this process, the master timestamp 124 may be used.

Specifically, as illustrated in FIG. 14, the active set information of the secure data information area 400 is checked, and the current master stamp of the software used in the secure zone S/Z is checked (step S810).

Thereafter, the master stamp value checked in the step S810 is changed (step S820). For example, when the master stamp value checked in the step S810 is the master stamp A, it is changed to the master stamp B.

Thereafter, the timestamp table area 123 is encrypted and backed up in the timestamp table backup area 330, and the master tag 125 generated in the encryption process is stored in the RAM 120 (step S830).

Thereafter, the secure non-volatile data swapped out in the first memory 30 is written in the secure non-volatile data backup area 200 (step S840).

Thereafter, the master stamp and master tag information are written in the secure data information area 400 (step S850). For example, when the active set information of the software currently executed by the secure processor 100 is A, information of the master stamp and the master tag in the step S850 is written in the area for the master stamp B and the master tag B. This is because the master stamp is changed in the step S820.

Thereafter, the active set information is changed (step S860). For example, when the active set information of software currently executed by the secure processor 100 is A, it is changed to B.

An embodiment of a method of reading secure non-volatile data from the second memory 20 will be described with reference to FIGS. 12, 17, and 22.

First, the first memory 30 reads secure non-volatile data from the secure non-volatile data backup area 200 (step S900).

Thereafter, by checking the active set information of the security data information 400 (step S910), the valid master timestamp 124 information and the master tag 125 are obtained, and using these, the timestamp table backup area 330 is decrypted (step S920) and stored in the timestamp table area 123 of the RAM 120.

In addition, the security is verified by comparing the tag generated in the decryption process with the master tag 125 (step S930).

Thereafter, pages of the swap region 310 are decrypted using the timestamp restored in the timestamp table area 123, and are swapped in to the RAM cache area 122. In addition, the security may be verified by comparing the tag generated in the decryption process with that of the tag table area 320.

Although embodiments of the present disclosure have been described above with reference to the accompanying drawings, it will be understood by those of ordinary skill in the art that the present disclosure is not limited thereto and may be implemented in many different forms without departing from the technical idea or essential features thereof. Therefore, it should be understood that the embodiments set forth herein are merely examples in all respects and not restrictive.

What is claimed is:

1. A system on chip comprising:
    a secure processor including,
        a random access memory (RAM) including a RAM cache area configured to store a page, a timestamp table with a timestamp, and a master timestamp,
        a central processing unit (CPU) configured to execute software having a size larger than a size of the RAM by performing swap-out operation and a swap-in operation to swap the page and the timestamp table between the RAM and a first memory disposed outside of the system on chip by,
            encrypting, by an encryption/decryption engine within the secure processor, the page by using the timestamp to generate an encrypted page having an encrypted format and a tag for the encrypted page,
            encrypting, by the encryption/decryption engine, the timestamp table by using the master timestamp to generate an encrypted timestamp table, and
            transmitting, by a direct memory access (DMA) module within the secure processor, (i) the encrypted page to a swap area of the first memory disposed outside the system on chip, (ii) the encrypted timestamp table to a timestamp backup area of the first memory, and (iii) the tag to a tag table area of the first memory.

2. The system on chip of claim 1, wherein the first memory is a volatile memory.

3. The system on chip of claim 1, further comprising:
an application processor including a plurality of CPU cores;
a first memory interface in communication with the first memory; and
a second memory interface in communication with a second memory, wherein the first memory interface and the second memory interface are configured to communicate to back up the swap area, the tag table area, and the timestamp backup area of the first memory in the second memory, and the second memory is disposed outside the system on chip.

4. The system on chip of claim 1, wherein the RAM configured to store the master timestamp and a master tag used for encryption of the page in the RAM cache area.

5. The system on chip of claim 4, wherein the DMA module is further configured to send the master timestamp and the master tag to a secure data information area of a secure non-volatile storage disposed outside the system on chip through a secure channel.

6. The system on chip of claim 5, wherein
the security data information area configured to store a universally unique identifier (UUID) for each of the software executed by the security processor, the master timestamp, the master tag and active set information, and
the active set information specifies the master timestamp and the master tag to be used by the universally unique identifier.

7. The system on chip of claim 1, wherein
the security processor further includes a memory management unit (MMU) using a memory management table (MMT) configured to store a virtual memory address, a physical memory address, dirtiness and validity of the page, and
the dirtiness indicates whether the page in the RAM cache area has been changed after the page is swapped into the RAM cache area.

8. The system on chip of claim 7, wherein the validity indicates whether at least one of the virtual memory address or the physical memory address of the page is valid.

9. A secure processor comprising:
a random access memory (RAM) including a RAM cache area configured to store a page and a timestamp table including a timestamp used to encrypt the page;
an encryption/decryption engine configured to receive the page and the timestamp from the RAM, encrypt the page, and generate a tag; and
a central processing unit (CPU) configured to execute software having a size larger than a size of the RAM by performing swap-out operation and a swap-in operation to swap the page and the timestamp table between the RAM and a first external memory by,
encrypting, via the encryption/decryption engine, page by using the timestamp to generate an encrypted page having an encrypted format and the tag for the encrypted page,
encrypting, via the encryption/decryption engine, the timestamp table by using a master timestamp to generate an encrypted timestamp table, and
transmitting, via a direct memory access (DMA) module within the secure processor, (i) the encrypted page to a swap area of the first memory disposed outside the system on chip, (ii) the encrypted timestamp table to a timestamp backup area of the first memory, and (iii) the tag to a tag table area of the first external memory.

10. The secure processor of claim 9, further comprising:
a memory management unit using a memory management table configured to store a virtual memory address, a physical memory address, dirtiness and validity of the page,
wherein the dirtiness indicates if after the page is transmitted to the RAM cache area the page in the RAM cache area is changed.

11. The secure processor of claim 9, wherein
the RAM is configured to store the master timestamp and a master tag used for encryption of the page, and
the master timestamp and the master tag are transmitted to a secure data information area of a secure non-volatile storage through a secure channel by a DMA module.

12. The secure processor of claim 11,
wherein the security data information area is configured to store a universally unique identifier for each of the software executed by the security processor, the master timestamp, the master tag and active set information, and
the active set information specifies the master timestamp and the master tag to be used by the universally unique identifier.

13. A semiconductor system comprising:
a system on chip including an application processor including a plurality of CPU cores and a secure processor the secure processor including,
a random access memory (RAM) configured to store a RAM cache area storing a page and a timestamp table storing a timestamp, and
a central processing unit (CPU) configured to execute software having a size larger than a size of the RAM by performing swap-out operation and a swap-in operation to swap the page and the timestamp table between the RAM and a first memory disposed outside of the system on chip by,
encrypting, by an encryption/decryption engine within the secure processor, the page by using the timestamp to generate an encrypted page having an encrypted format and a tag for the encrypted page,
encrypting, by the encryption/decryption engine, the timestamp table by using a master timestamp to generate an encrypted timestamp table, and
transmitting, by a direct memory access (DMA) module within the secure processor, (i) the encrypted page to a swap area of the first memory, (ii) the tag to a tag table area of the first memory, and (iii) the encrypted timestamp table to a timestamp backup area of the first memory; and
the first memory and a second memory outside the system on chip, the first memory including the swap area storing the encrypted page, the tag table area configured to store the tag generated by the encryption/decryption engine encrypting the page, and the timestamp backup area configured to store the timestamp, and the second memory including a non-volatile data backup area configured to back up the swap area, the tag table area, and the timestamp backup area.

14. The semiconductor system of claim 13, wherein the first memory is a volatile memory.

15. The semiconductor system of claim 13, wherein the system on chip further includes a first memory interface in communication with the first memory, and a second memory interface in communication with the second memory.

16. The semiconductor system of claim 13, wherein the RAM stores the master timestamp and a master tag used for encryption of the page in the RAM cache area.

17. The semiconductor system of claim 16, further comprising:
   a secure non-volatile storage disposed outside the system on chip and configured to communicate with the secure processor through a secure channel,
   wherein the secure non-volatile storage includes a secure data information area in which the master timestamp and the master tag are stored.

18. The semiconductor system of claim 17, wherein
   the security data information area stores a universally unique identifier for each of the software executed by the security processor, the master timestamp, the master tag and active set information, and
   the active set information specifies the master timestamp and the master tag to be used by the universally unique identifier.

19. The semiconductor system of claim 13, wherein
   the secure processor further includes a memory management unit using a memory management table storing a virtual memory address, a physical memory address, dirtiness and validity of the page, and
   the dirtiness indicates whether the page in the RAM cache area has been changed after the page is swapped into the RAM cache area.

20. The semiconductor system of claim 19, wherein the validity indicates whether at least one of the virtual memory address or the physical memory address of the page is valid.

* * * * *